(12) United States Patent
Libsch et al.

(10) Patent No.: US 6,333,728 B1
(45) Date of Patent: Dec. 25, 2001

(54) METHOD AND APPARATUS FOR REAL-TIME ON-OFF CONTRAST RATIO OPTIMIZATION IN LIQUID CRYSTAL DISPLAYS

(75) Inventors: Frank R. Libsch, White Plains; Kei-Hsiung Yang, Katonah, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/146,897

(22) Filed: Sep. 3, 1998

(51) Int. Cl.$^7$ ................................................ G09G 3/36
(52) U.S. Cl. ............................ 345/90; 345/87; 349/72
(58) Field of Search .............................. 345/101, 81, 87, 345/90, 199; 349/72

(56) References Cited

U.S. PATENT DOCUMENTS

| | | | |
|---|---|---|---|
| 4,128,311 | * 12/1978 | Smith et al. | 349/72 |
| 4,239,346 | * 12/1980 | Lloyd | 349/44 |
| 4,298,866 | * 11/1981 | Hodemaeker | 345/101 |
| 4,387,963 | * 6/1983 | Brennan | 349/199 |
| 4,460,247 | * 7/1984 | Hilsum et al. | 349/199 |
| 4,775,221 | * 10/1988 | Baumgartner | 349/161 |
| 5,012,274 | 4/1991 | Dolgoff . | |
| 5,029,982 | * 7/1991 | Nash | 349/72 |
| 5,088,806 | * 2/1992 | McCartney et al. | 345/101 |
| 5,300,942 | 4/1994 | Dolgoff . | |
| 5,489,918 | 2/1996 | Mosier . | |
| 5,597,223 | 1/1997 | Watanabe et al. . | |
| 5,602,679 | 2/1997 | Dolgoff et al. . | |
| 5,608,422 | * 3/1997 | Ikeda | 345/101 |
| 5,694,147 | 12/1997 | Gaalema et al. . | |
| 5,717,421 | 2/1998 | Katakura et al. . | |
| 5,936,603 | * 8/1999 | Lippmann et al. | 345/101 |

FOREIGN PATENT DOCUMENTS

| | | |
|---|---|---|
| 62-23024 | 1/1987 | (JP) . |
| 4-131829 | 5/1992 | (JP) . |

OTHER PUBLICATIONS

IBM Technical Disclosure Bulletin, vol. 36, No. 10 (Oct. 1993) "Compensation of Liquid Crystal Display Contrast and Brightness for Temperature Variation", pp. 381–382/.

* cited by examiner

Primary Examiner—Richard Hjerpe
Assistant Examiner—Alexander Eisen
(74) Attorney, Agent, or Firm—Scully, Scott, Murphy & Presser; Marian Underweiser, Esq.

(57) ABSTRACT

An apparatus provides optimal on-off contrast ratio in a liquid crystal display panel. The apparatus includes a capacitive temperature sensing device for sensing the temperature of liquid crystal display pixels and having an output voltage according to an applied input voltage and a sensed temperature;
a monitoring device including differentiator and sample and hold circuit for obtaining a peak voltage corresponding to a maximum change of the voltage output from the temperature sensing device; and a device for measuring a difference between the peak voltage with a predetermined reference voltage and outputting a signal representing the difference. Heat is consequently applied to the liquid crystal display panel in accordance with a measured temperature difference. Advantageously, the capacitive temperature sensing device is formed as part of the liquid crystal display element.

9 Claims, 5 Drawing Sheets

METHOD AND APPARATUS FOR REAL-TIME ON-OFF CONTRAST RATIO OPTIMIZATION IN LIQUID CRYSTAL DISPLAYS

BACKGROUND OF THE INVENTION

1. Field of the Invention

The present invention relates generally to the field of liquid crystal display devices, and, more particularly, to a novel liquid crystal display structure having optimized on-off contrast ratio for implementation as part of a liquid crystal display panel.

2. Discussion of the Prior Art

Normally, a liquid crystal cell gap thickness is determined and built, and the applied voltage placed across the liquid crystal will determine the amount of optical transmission. Since the on-off contrast ratio is the maximum to minimum light transmission ratio, a small voltage shift in the liquid crystal optical transmission versus voltage characteristics, for example, can change the minimum transmission enormously and degrade the on-off contrast ratio. In addition, the future trend in scaling to ever higher bit (more gray levels) displays produces a more stringent requirement on the hysteresis of the transmission versus voltage characteristics. One such change in the transmission versus voltage characteristics can occur as a result of a change in operating temperature. A second such change in the transmission versus voltage characteristics will result if a light valve designed with a liquid crystal cell gap for one wavelength of light (or color) is used with another wavelength of light.

There exists liquid crystal display devices that employ temperature sensing to control the optical transmission properties of screen displays. U.S. Pat. No. 5,717,421 describes a system for correcting display panel drive signals based on a detected current signal associated with a pixel. In the system described, parameters are measured to determine current threshold characteristics of a pixel and the display is accordingly corrected based on detected threshold data and sensed temperature data of the display panel.

U.S. Pat. No. 5,694,147 describes a system for controlling the temperature of the liquid crystal material utilizing a temperature sensor and a servo external to the liquid crystal display. In the system described, temperature sensing circuitry implements a resistive Wheatstone bridge for incorporation in proximity to a liquid crystal display panel. A control circuit is provided to control the liquid crystal display temperature, and implements a bipolar transistor and a resistive heating element. Because of this system's external and non-integrated approach for maintaining temperature control, this technique is relatively inefficient and expensive to implement.

Thus, it would be highly desirable to provide a on-off contrast ratio optimization technique employing a temperature compensation and control system for a liquid crystal display device that is efficient, cost-effective, and integrated as part of high-contrast liquid crystal panel displays.

SUMMARY OF THE INVENTION

The present invention is directed to a method and apparatus for obtaining the optimum on-off contrast ratio for liquid crystal displays using either an on display panel or off display panel temperature sensing and compensation circuit. The temperature sensing is accomplished by a liquid crystal capacitor, a diode, or any other device where the temperature characteristics are known. The advantage of using a liquid crystal capacitor is that it is inherent to the liquid crystal display element, i.e., forms part of a pixel element, thus requires no extra fabrication techniques to implement. Another advantage of using a liquid crystal capacitor is that it has a one to one transfer function when relating the sensed temperature to the liquid crystal pixels. A compensation circuit is provided to monitor the temperature and provide feedback to a heat producing element (such as a resistor, etc.) to stabilize the temperature to some determined value. Since on-off contrast ratio is most sensitive to the transmission (or reflection) in the off state, a scheme is deployed to monitor the off state of the liquid crystal capacitor.

According to the principles of the invention, there is provided an apparatus for providing optimal on-off contrast ratio in a liquid crystal display panel including liquid crystal elements having optical transmission properties dependent upon applied voltage and temperature, the apparatus comprising: a temperature sensing means for sensing the temperature of liquid crystal display pixels and having an input voltage applied thereto, the temperature sensing means outputting a voltage according to an applied input voltage and a sensed temperature; a means for monitoring output voltage of the temperature sensing means and obtaining a peak voltage corresponding to a maximum change of the voltage output from the temperature sensing means; a means for measuring a difference between the peak voltage with a predetermined reference voltage, and outputting a signal representing said difference; and, means for applying heat to the flat panel display in accordance with the measured temperature difference whereby the temperature sensing means is part of a liquid crystal display element.

Advantageously, the method and apparatus for real-time liquid crystal transmission versus voltage characteristics optimization methodology may be effectively employed in high gray scale resolution projection displays or high contrast ratio projection displays. Additionally, a projection system designed with three light valves for optimizing the on-off contrast ratios as a function of light color, can be further reduced to one light valve with the disclosed method.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 1:
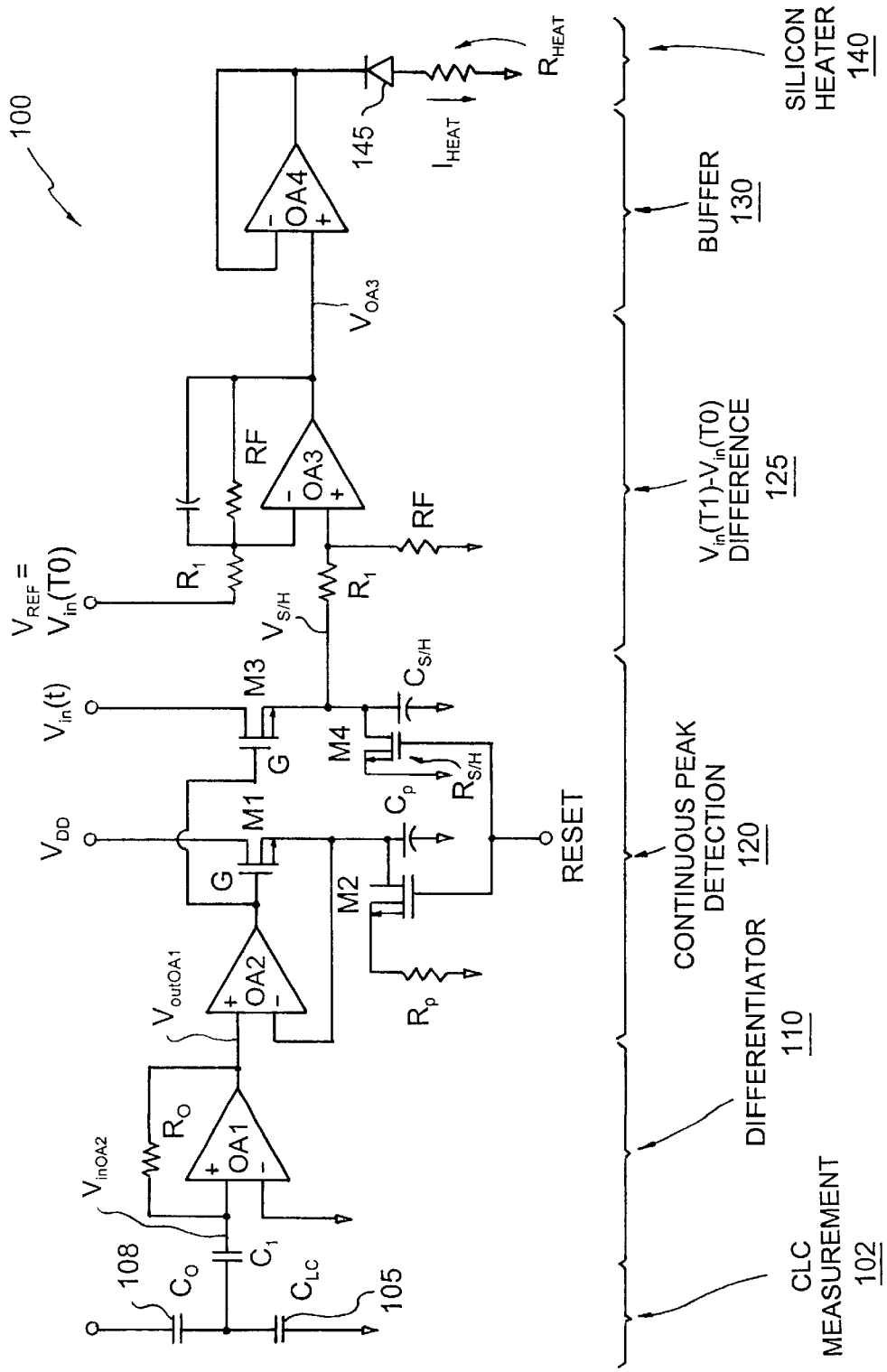
FIG. 1 illustrates the apparatus of the present invention for controlling and optimizing the on-off contrast ratio of liquid crystal displays.
Figure 3:
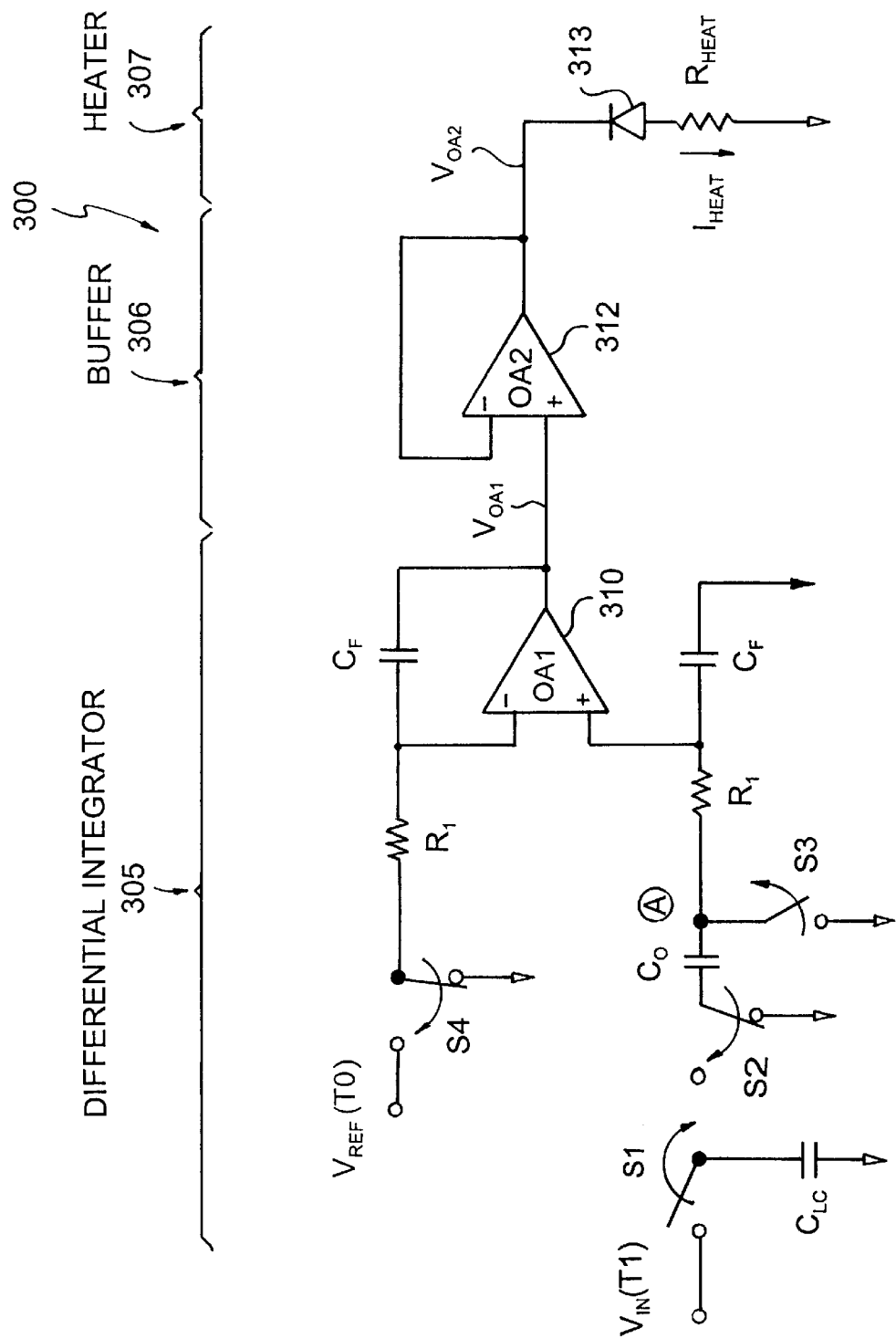
FIG. 3 illustrates an alternate embodiment of the apparatus for controlling and optimizing the on-off contrast ratio of liquid crystal displays.

FIG. 1 illustrates a schematic diagram of the apparatus 100 employed for obtaining optimum on-off contrast ratio for liquid crystal displays of a first embodiment. FIG. 3 illustrates the circuit 300 employed for obtaining optimum on-off contrast ratio for liquid crystal displays according to an alternate embodiment.

Figure 2A:
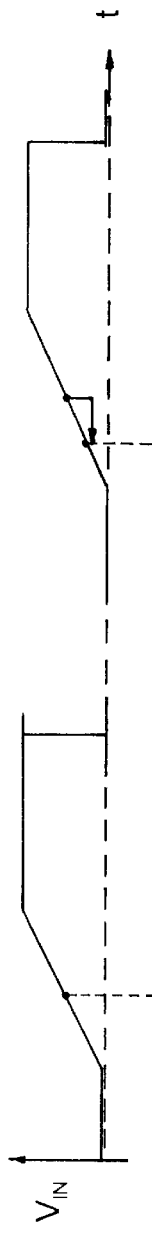
FIGS. 2(a)–2(i) illustrate timing diagrams of signals operating in the apparatus of FIG. 1.
Figure 2B:
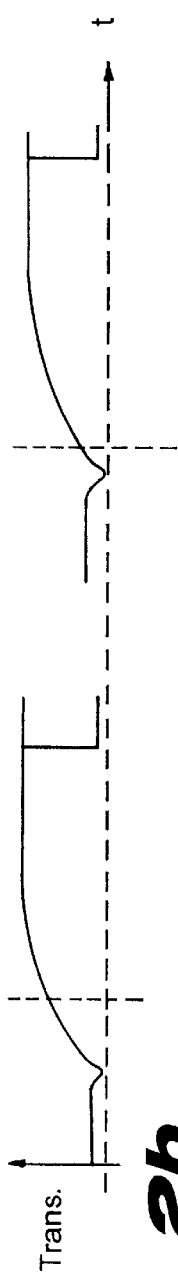

In the embodiment shown in FIG. 1, the circuit 100 implements a temperature compensation circuit component 102 including a liquid crystal capacitor 105 as the temperature sensor, denoted $C_{lc}$, which capacitor forms a part of a liquid crystal display panel. As shown in the timing diagram of FIG. 2(c), capacitance $C_{lc}$ has an approximately constant value up to a threshold voltage, $V_t$, and above this value, steadily increases achieving a value 2 to 3 times the original value at threshold. This change in capacitance is accompanied by a change in the optical transmission properties, as shown in FIG. 2(b), resulting in a temperature sensitivity of about 1%/° C. The temperature compensation circuit 102 is designed with a temperature sensitivity considerably less than the temperature sensitivity of the $C_{lc}$ capacitor by the capacitance ratio $$\left(\frac{C_0}{C_{1c}(t) + C_0}\right).$$

Specifically, to provide for minimum temperature sensitivity, switched capacitors, e.g., constructed from capacitors and transistors, may be implemented in the temperature compensation circuit 102 of FIG. 1. The temperature coefficient of capacitors are generally 10 to 50 ppm, and, with the use of a MOS capacitor, may be controlled, e.g., to within an accuracy of 5–10 percent. The ratio of two capacitors, however, may be made accurate to within a fraction of 1 percent (typically 0.1 percent). Also, very stable voltage references for powering op amps elements can be designed in NMOS and CMOS technology to give less than 2 ppm/° C. and less than 45 ppm/° C., respectively, over a 100° C. range. Thus, in the embodiment shown in FIG. 1, temperature compensation circuit 102 comprises a fixed capacitor 108, denoted as $C_0$, forming a voltage divider with temperature sensing capacitor $C_{lc}$ 105 for sensing the change of $C_{lc}$. As shown in the timing diagram of FIG. 2(c), the capacitance value $C_0$ remains unchanged, i.e., is not temperature or voltage dependent. The output voltage "$V_{inOA1}$" of the series capacitor voltage divider is thus given by the expression of equation 1 as follows:

$$V_{inOA1} = \left(\frac{C_0}{C_{1c}(t) + C_0}\right) V_{in}(t) \quad (1)$$

where $V_{in}(t)$ is the real time voltage input driving the liquid crystal display circuit as a function of time "t".

Figure 2C:
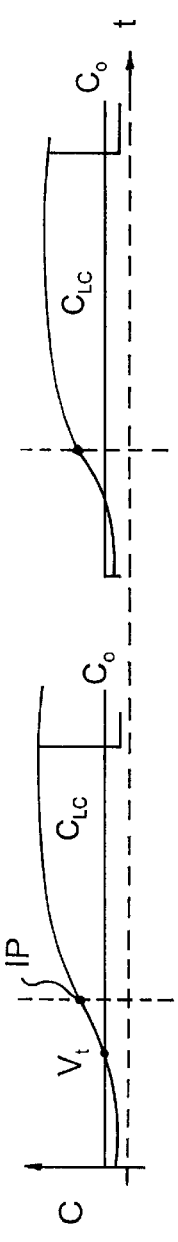
Figure 2D:

As further shown in FIG. 1, a differentiator component 110 is provided that includes operational amplifier "OA1" and resistor $R_0$ and $C_1$ for performing a differentiation function on the voltage $V_{in}(t)$ of equation 1. As shown in FIG. 2(a), $V_{in}(t)$ is depicted as a fixed ramp of linear slope changing from a minimum voltage to a maximum voltage across the liquid crystal capacitor. It should be understood that this $V_{in}(t)$ voltage may be externally applied, is periodic according to an LCD panel refresh rate, and may be of opposite polarity of slope than as shown in FIG. 2(a). Additionally, as shown in FIG. 2(c), the capacitance of $C_{lc}$ does not change uniformly, i.e., is nonlinear, and continues to increase with applied voltage after $C_{lc}$ becomes larger than $C_0$. The point of maximum slope of the $C_{lc}$ capacitance curve of FIG. 2(c) is the inflection point, denoted as "IP", and is equal to a voltage $V_{lc}$. The voltage $V_{lc}$ at this inflection point is defined as equal to $V_{REF}=V_{in}(T0)$ and is input to the inverting terminal of op-amp OA3, as shown in FIG. 1. Referring back to FIG. 2(c), the point of maximum slope of the liquid crystal capacitance $C_{lc}$ is detected by the operational amplifier OA1 of the differentiator circuit 110. Thus, as shown in FIG. 2(d), the output of op-amp OA1, "$V_{outOA1}$", represents the rate of change of the $C_{lc}$ capacitor, and peaks at the $C_{lc}$ inflection point IP. Operational amplifier OA3 differentiates this inflection point to output a maximum peak voltage.

As further shown in FIG. 1, there is a continuous peak detection component 120 comprising unity gain buffer amplifier "OA2" with the output following the input $V_{outOA1}$. Additionally, continuous peak detection circuit 120 comprises MOS transistor elements M1–M4, resistor components $R_{S/H}$ and $R_P$, and, capacitor components $C_{S/H}$ and $C_p$ to provide a peak voltage detection function of the $V_{outOA1}$ signal. It should be understood that this circuit may be incorporated as part of the liquid crystal display panel, and consequently, transistors, resistors, capacitors and associated components may comprise thin-film transistors, e.g., n-channel TFT, amorphous silicon (a-Si) resistors, and oxide or nitride capacitors, within the display. This method is preferred as these elements may be readily fabricated during the liquid crystal display manufacturing process with little or no extra fabrication steps. In further view of FIGS. 1 and 2(f), a reset voltage $V_{reset}$ is held at a zero voltage, during which time transistors M2 and M4 remain off, i.e., non-conducting. Preferably, a $V_{reset}$ pulse is applied to the gate terminals of M2 and M4 of the continuous peak detection component 120 at the display panel refresh rate which functions to discharge capacitors $C_{S/H}$ and $C_p$ through respective resistor components $R_{S/H}$ and $R_P$.

Figure 2E:
Figure 2F:
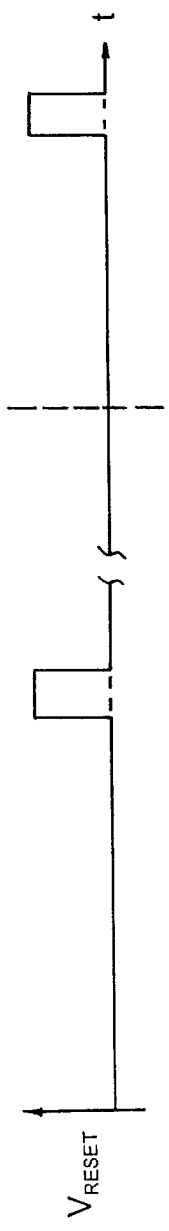
Figure 2G:
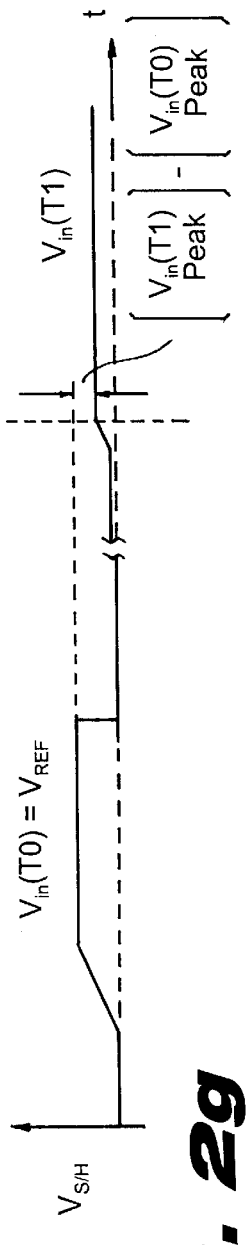

In view of FIG. 1, with more particularity, the $V_{outOA1}$ output of OA2 is input to the respective gate terminals of the two MOS transistors, M1 and M3. The input to the source terminal of transistor M3 is the original linear ramp voltage $V_{in}(t)$ while the gate terminal of M3 receives the non-linear $V_{outOA2}$. Thus, the gate voltage of M3 is and the voltage at the source of transistor M3 are increasing which enables M3 to conduct. Conduction of transistor M3 results in the charging of sample and hold capacitor $C_{S/H}$ until the IP is reached such as shown in FIG. 2(g) at which point $V_{S/H}$ across capacitor $C_{S/H}$ levels off because the gate voltage at M3 stops increasing.

Additionally, the input to the source terminal of transistor M1 is a fixed voltage input $V_{DD}$ while the gate terminal of M1 receives the non-linear amplified $V_{outOA1}$. Transistor M1 is thus conducting by virtue of negative feedback at the negative input terminal op-amp OA2, and applied voltages at the gate and source terminal of M1. Thus, the gate voltage of M1 is changing faster than the fixed source voltage which enables M3 to conduct. As M2 is non-conducting, the current through transistor M1 steadily charges capacitor $C_p$ until the IP is reached as shown in FIG. 2(e) at which point $V_P$ across capacitor $C_p$ levels off. It should be mentioned that the voltage curve $V_P$ (FIG. 2(e)) is almost identical to the voltage curve $V_{S/H}$ (FIG. 2(g)), however, the voltage curve $V_{S/H}$ is linearized, due to the original input $V_{in}(t)$ at the M3 source terminal.

Referring back to FIG. 1 and 2(d), the time at which the rate of change of capacitance $C_{LC}$ is not changing as fast, i.e., past the IP point, $V_{outOA1}$ decreases. Consequently, the utilization of negative feedback at op-amp OA2 acts to swiftly turn off the output of op-amp OA2 and effectively turn off transistors M1 and M3 in the manner as follows: FIG. 2(e) shows the voltage $V_P$ at capacitor $C_p$ which charges with increasing current through transistor M1. Once the peak rate of change of $C_{LC}$ (FIG. 2(c)) is reached at the IP, the voltage $V_P$ at capacitor $C_p$ remains constant due to the zero $V_{RESET}$ voltage which prevents $C_p$ from discharging. However, the voltage at the output of the op-amp OA2 swings negatively once $V_{outOA1}$ at the non-inverting input terminal of OA2 decreases below the $V_p$ voltage held constant at the inverting terminal. At that instant, the gate terminals of both transistors M1 and M3 are turned off. Thus, op-amp OA2 functions like a comparator, with the voltage output $V_{OA2}$ being equal to the maximum voltage, i.e., $V_{outOA2}=V_{max}=V_{peakOA1}$ As a result of transistor M3 being turned off, the voltage $V_{S/H}$ held at sample and hold capacitor $C_{S/H}$ as a result of M3 conducting is thus equal to $V_{max}$ the peak voltage.

Figure 2H:
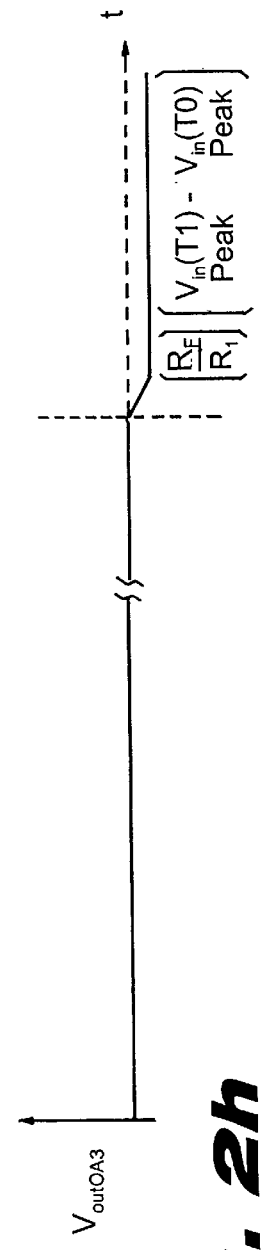

As shown in FIG. 1, this $V_{S/H}$ voltage is input to a difference component 125 comprising a difference amplifier OA3 for comparing the $V_{S/H}$ voltage with a $V_{REF}$ voltage which is the arbitrarily set voltage corresponding to a predefined reference temperature "T0", i.e., $V_{REF}=V_{IN}(T0)$. As mentioned, in the preferred embodiment, $V_{IN}(T0)$ is the voltage corresponding to the $C_{lc}$ at temperature $T_0$ that the data gray scale level has been originally referenced to. If these voltages are equal, i.e ., $V_{max}=V_{S/H}=V_{REF}$, the output of op-amp OA3, $V_{OA3}$, is zero. If the reference temperature $V_{REF}$ is more positive, i.e., greater than, the sampled peak voltage $V_{S/H}$ across $C_{S/H}$, then the voltage $V_{OA3}$ output is of negative polarity, having an amplitude that is a function of the voltage difference multiplied by a gain factor $R_f/R_1$. This instance is shown in the second cycle shown of the example timing diagram of FIGS. 2(g) and 2(h), as will be further explained. In the case where the $V_{S/H}$ temperature is more positive than the reference voltage $V_{IN}(T0)$, then the $V_{OA3}$ output is of positive polarity, having an amplitude that is a function of the voltage difference multiplied by a gain factor $R_f/R_1$.

Figure 2I:
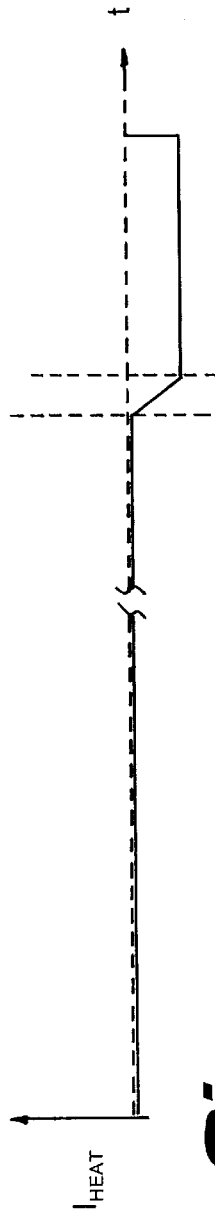

Finally, as shown in FIG. 1, there is provided an output buffer component 130 comprising unity gain op-amp "OA4" and a heater element component 140 comprising heating resistor $R_{HEAT}$. The output buffer component of the difference amplifier provides a current $I_{HEAT}$ for driving the heater element $R_{HEAT}$. In the case illustrated in FIGS. 2(g) and 2(h) when $V_{REF}$ is greater than the sampled peak voltage $V_{S/H}$, it is desirous to control temperature by adding heat to the display panel. Thus, the voltage $V_{OA3}$ output is of negative polarity (FIG. 2(h)), and a diode element 145 configured as shown in FIG. 1, will pass current to the heater element $R_{HEAT}$ as shown in the second cycle of the $I_{HEAT}$ timing diagram shown in FIG. 2(i), thus bringing the temperature of the LCD panel to the reference temperature corresponding to $V_{REF}$. Otherwise, if the polarity of voltage $V_{OA3}$ is positive, the diode 145 prevents conduction of current to the heater element $R_{HEAT}$.

It should be understood that sampling and comparison of the voltage across the liquid crystal capacitor $C_{LC}$ may occur at pre-defined times specified by the user. For instance, under normal household or business operating and environmental conditions, the sampling may occur at a low rate, e.g., once every ten minutes. In an LCD panel incorporated in a military aircraft, the sampling may occur at a significantly higher rate, e.g., once every second.

FIG. 3 illustrates a schematic diagram of an alternate circuit 300 employed for obtaining optimum on-off contrast ratio for liquid crystal displays. The embodiment is similar to the one shown and described above with respect to FIG. 1, however, with the omission of a continuous peak detection stage.

As shown in FIG. 3, the on-off temperature compensation circuit 300 of a first embodiment comprises a differential integrator circuit 305 comprising an op-amp circuit 310 having negative and positive input terminals. Voltage $V_{IN}$ (T1) is the display driving voltage at a temperature T1 representing the temperature of the display at any given time. As shown in FIG. 2(a) this voltage is shown as a ramp, however, it is understood that in each display refresh cycle, polarity may be reversed to avoid polarizing of the liquid crystal and the resultant degradation, e.g., display sticking. Voltage $V_{REF}(T0)$ is an voltage corresponding to a predetermined reference temperature, e.g., this voltage may be set at higher voltage corresponding to a higher temperature than what the display would see, as it is easier to heat the display than to cool it. It should be understood that the voltage $V_{REF}$ may be a bandgap voltage reference, which is stable with temperature.

A temperature sensing capacitor $C_{LC}$ is provided at the input having a capacitance versus time characteristic as shown in FIG. 2(c). Activation of switches S1–S3 at a user defined time interval enable coupling of the voltage present across $C_{LC}$ through capacitor $C_0$ and resistor R1 to the positive input terminal of op-amp 310.

Simultaneously, switch S4 is activated to provide the reference voltage $V_{REF}(T0)$, to the negative input terminal of op-amp 310. The differential integrator (difference amplifier) 305 compares the $V_{IN}(T1I)$ voltage with the $V_{REF(T}0)$ and provides an output. If these voltages are equal, the output of op-amp OA1, $V_{OA1}$, is zero. If the reference temperature $V_{REF}(T0)$ is more positive than $V_{IN}(T1)$ then the voltage $V_{OA1}$ output is of negative polarity, having an amplitude that is a function of the voltage difference multiplied by a gain factor $C_0/C_F$. Similarly, if the $V_{IN}(T1)$ temperature is more positive than then the reference voltage $V_{REF}(T0)$, then the $V_{OA1}$ output is of positive polarity, having an amplitude that is a function of the voltage difference multiplied by a gain factor $C_0/C_F$.

The next stage 310 is a unity buffer stage 306 including a unity gain buffer op-amp 312 for providing a current drive to a heater stage 307. The voltage output $V_{OA2}$ of op-amp 312 tracks the voltage $V_{OA1}$ which is either of positive or negative polarity, or zero. This output voltage $V_{OA2}$ provides current $I_{HEAT}$ through the heater element, $R_{HEAT}$, which is used to heat the display according to the differential voltage measure output from the differential integrator stage. In the preferred embodiment, a rectifying diode 313 is provided at the output of op-amp 312 to prevent positive voltage from driving the heater element. Thus, if the LCD panel is operating at a temperature that is higher than the voltage reference temperature, i.e., $V_{IN}(T1)>V_{REF}(T0)$, the output of op-amp 310 and 312 will accordingly be of positive polarity, however, will be prevented from driving the heating element $R_{HEAT}$ due to rectifying diode 313. If the LCD panel is operating at a lower temperature than the voltage reference temperature, i.e., $V_{IN}(T1)<V_{REF}(T0)$, the output of op-amp 310 and 312 will accordingly be of negative polarity, and is able to drive the heating element $R_{HEAT}$ to accordingly increase the temperature of the display. It should be understood that the $V_{REF}(T0)$ may be arbitrarily raised to a voltage corresponding to the highest expected temperature deviation e.g., 40° C. In this manner, current will always be added to the heater element to some degree.

It should be noted that $R_{HEAT}$ can be located in various places, for example, in the substrate circumventing the LCD pixel array, or, in a transparent conducting film such as an Indium-Tin-Oxide (ITO) layer covering the liquid crystal. Depending on the substrate, the $R_{HEAT}$ resistor may be fabricated in c-Si, poly-Si, or a-Si and, depending upon the technology, may have a resistance value anywhere from about 100 ohms to about 1 Mohm. If the resistor $R_{HEAT}$ is in an ITO layer, a few extra processing steps may be required since more current (about 10 times), optical matching index layers, and uniform area heating is required. Depending on the gap thickness, mode and material, approximately 20 mJ/cm$^2$/° C. is needed by the liquid crystal. For a design requiring quick temperature compensation, as for instance during startup (1 second) with a 3 um cell gap and a 10 cm$^2$ array area, the liquid crystal would require 0.2 W/° C.

Figure 4:
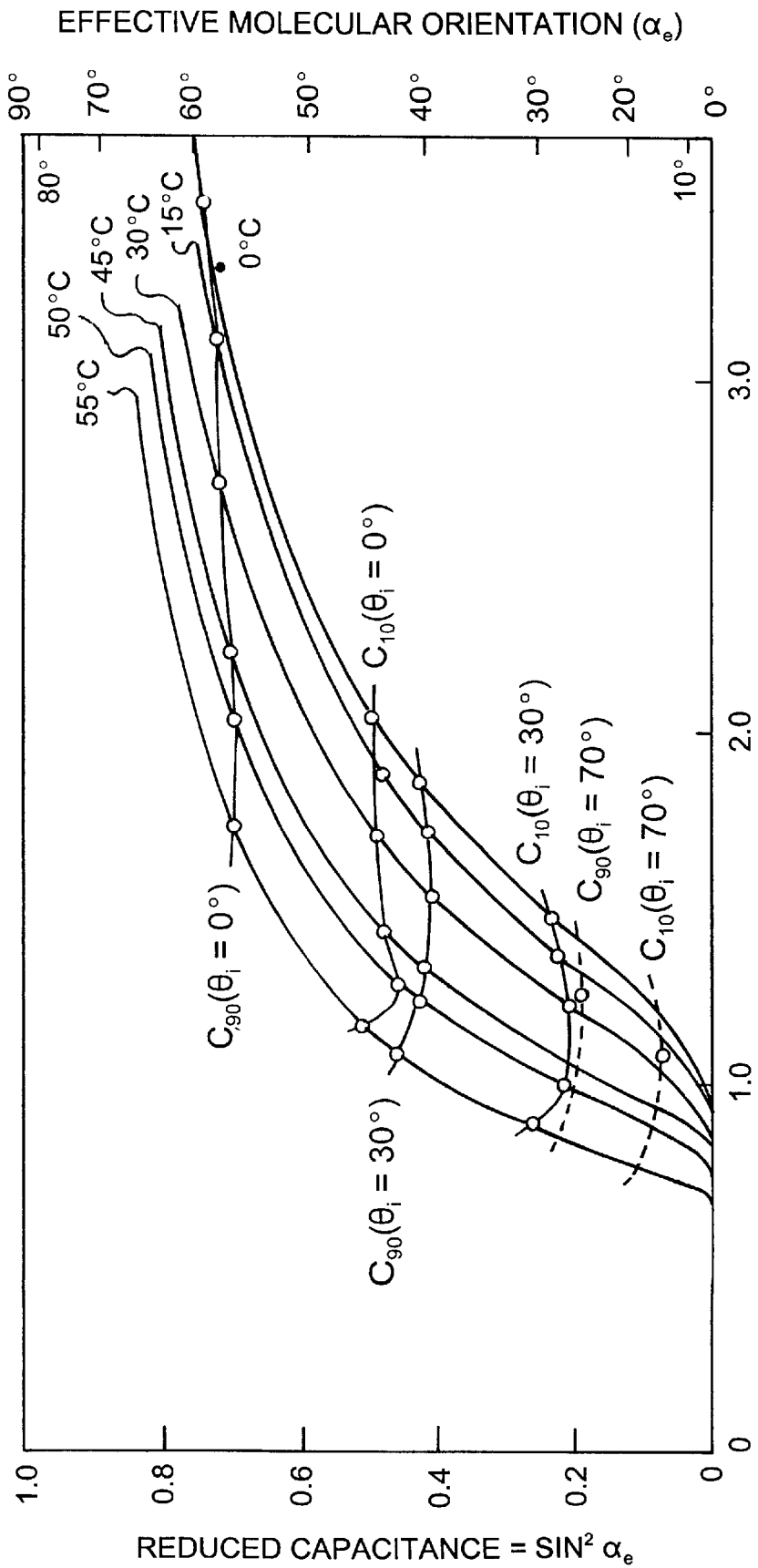
FIG. 4 illustrates a plot showing the relationship between reduced liquid crystal capacitance vs applied voltage at various temperature values.

Further, it should be understood that the embodiments of the invention depicted in FIGS. 1 and 3 do not rely on a parallel shift of $C_{lc}$ versus voltage as a function of temperature and will function properly if (1) $C_{lc}$ is a monotonically increasing or decreasing function over the voltage range of interest, and (2) that the $C_{lc}$ versus voltage curves at different temperatures do not cross each other. FIG. 4 illustrates a graph depicting the dependence of reduced capacitance on temperature and, its relation to optical transmission thresholds. It is readily seen from FIG. 4 that the above criteria are met.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. An apparatus for providing optimal on-off contrast ratio in a liquid crystal display panel including liquid crystal elements having optical properties dependent upon applied voltage and temperature, said apparatus comprising:

temperature sensing means formed in a pixel element of said liquid crystal display panel for directly sensing the temperature of liquid crystal display pixels and having an input voltage applied thereto, said temperature sensing means outputting a voltage according to an applied input voltage and a sensed temperature;

differentiator means for continuously monitoring output voltage of said temperature sensing means and obtaining a peak voltage corresponding to a maximum rate of change of said voltage output from said temperature sensing means;

means for measuring a difference between said peak voltage with a predetermined reference voltage, and outputting a signal representing said difference; and, means for directly applying heat to said flat panel display in accordance with said measured temperature difference.

2. The apparatus as claimed in claim 1, wherein said temperature sensing means comprises a MOS capacitor integral with a liquid crystal display panel element having a capacitance that changes with applied voltage and temperature.

3. The apparatus as claimed in claim 2, wherein said temperature sensing means further includes a capacitor series voltage circuit indulging said MOS capacitor for providing said output voltage.

4. The apparatus as claimed in claim 2, wherein said means for continuously monitoring output voltage of said temperature sensing means and obtaining a peak voltage is enabled periodically at a user-defined rate.

5. The apparatus as claimed in claim 1, wherein said liquid crystal elements have transmissive optical properties.

6. The apparatus as claimed in claim 1, wherein said liquid crystal elements have reflective optical properties.

7. A method for providing optimal on-off contrast ratio in a liquid crystal display panel having liquid crystal elements having optical transmission properties dependent upon applied voltage and temperature; said method comprising:

a) applying driving voltage for said liquid crystal display panel voltage, b) dividing said voltage according to a voltage divider, an element of said voltage divider comprising a temperature sensing element formed in a pixel element of said liquid crystal display panel responsive to applied voltage and temperature, and outputting a sampled voltage representing a current sensed temperature;

c) continously differentiating said sampled output voltage and detecting a peak voltage corresponding to a maximum rate of change of said voltage output from said temperature sensing element;

d) measuring a difference between said peak voltage with a predetermined reference voltage, and outputting a signal representing said difference; and e) applying heat to said liquid crystal display in accordance with said measured temperature difference.

8. The method as claimed in claim 7, wherein said differentiating step c) further includes holding said detected peak voltage in a sample and hold circuit prior to said measuring step.

9. The method as claimed in claim 8, wherein said temperature sensing element comprises a MOS capacitor integral with a liquid crystal display panel element.

* * * * *